United States Patent [19]

Vereschagin et al.

[11] 3,854,854

[45] Dec. 17, 1974

[54] HIGH PRESSURE PRODUCING APPARATUS

[76] Inventors: Leonid Fedorovich Vereschagin, Kutuzovsky prospekt, 1/2, kv. 231, Moscow; Lev Grigorievich Khvostantsev, ulitsa Shkolnaya, 4, kv. 62, Moskovskaya oblast, Podolsky raion, Akademgorodok, both of U.S.S.R.

[22] Filed: Oct. 2, 1973

[21] Appl. No.: 402,858

[52] U.S. Cl. .............................. 425/77, 425/DIG. 26
[51] Int. Cl. ........................................... B30b 11/32
[58] Field of Search ....................................... 425/77

[56] References Cited
UNITED STATES PATENTS

| | | | |
|---|---|---|---|
| 2,941,243 | 6/1960 | Bundy | 425/77 |
| 2,941,244 | 6/1960 | Wentorf | 425/77 |
| 3,790,322 | 2/1974 | Sirota et al. | 425/77 |

*Primary Examiner*—J. Howard Flint, Jr.
*Attorney, Agent, or Firm*—Waters, Roditi, Schwartz & Nissen

[57] ABSTRACT

Two similar coaxially arranged dies have cut an annular groove in each respective face thereof, facing the plunger of the associated press. The edges of this groove extend along imaginary circles of which the centre is the centre of the respective face. A plastic medium is placed intermediate of each plunger and the respective face of the dies, so that this medium adjoins the central portion of this face and overlies the respective groove along the entire length thereof, at least partly in cross-section. With the dies being of the herein disclosed structure, the stress gradient along the axis of symmetry of the dies is substantially reduced.

5 Claims, 5 Drawing Figures

HIGH PRESSURE PRODUCING APPARATUS

The present invention relates to improved apparatus for producing high pressure and may be used for production of synthetic diamonds or of cubical boron nitride; it also may be employed as successfully at investigation of physical properties of solids at high and low temperatures and in magnetic fields under high pressure.

There is widely known an apparatus for producing high pressure, including a pair of similar coaxially arranged dies. A test sample is placed between the central portions of the faces of these dies, facing each other, and a solid medium is placed to surround this test sample, the medium being plastic under pressure and capable of transmitting to the sample the pressure produced by the dies being driven toward each other. (See, for example, Bridgman P. W., Proceedings Amer. Acod. Arts. Sci. 81.165/1952/).

In the present disclosure the expression "the central portion of the die" is meant to describe that portion of the faces of the dies where the test sample is placed and where the highest pressure is produced in operation.

In the abovementioned known high pressure producing apparatus the high pressure area is defined by the planes of the respective faces of the dies, facing each other and acting as the working surfaces of the dies, and the thin interlay of the medium that is plastic under pressure, e.g. a solid medium such as catlinite, pyrophilite and other similar stone-like materials. The dies are driven toward each other under the action of a press, applied to the external flat faces of the dies, these faces being hereinafter referred to as the bearing surfaces or bearing faces.

Maximal pressure that can be produced by the abovementioned apparatus is determined by the degree of compression of the solid medium and by the strength of those portions of the dies wherein the greatest stress is produced in operation, the whereabouts of these portions being defined by the distribution of the stress within the die. In the abovementioned known apparatus great stress gradients appear along the longitudinal axis of symmetry of the dies, in the direction from the working surfaces to the bearing surfaces, as the action of the press is applied to the dies to drive them toward each other.

Since the solid medium enclosed between the dies can be retained solely on account of the factor of friction between the medium and the flat surfaces of the dies and of the internal friction of the medium, the pressure is at its greatest at the centre of the working surface of the dies and steeply diminishes in the radial direction, equalling atmospheric pressure at the external edges of the dies.

As the dies are driven together, a portion of the solid medium surrounding the sample flows from the space between the working surfaces of the dies. The rest of the solid medium, remaining between the dies, and the sample are subjected to three-dimensional compression under the action of the pressure being produced. As this pressure rises to 100 kilobars and even higher, there takes place deformation of the dies, so that the space wherein the sample is enclosed has its volume increased accordingly, the working surfaces of the dies not remaining planar, but becoming somewhat lens-shaped.

For operation under room temperature, optimal thickness of the medium between the dies in an apparatus having flat working surfaces or anvils of a 12.7 mm diameter does not exceed 15 mm, while axial displacement of the central portion of the working surface of the dies after the test (with the pressure being in excess of 100 kilobars) is as great as 0.15 mm. This axial displacement is residual deformation of the dies. If elastic deformation of the dies is also taken into account, total axial displacement (deformation) of the working surface of the dies during the test is, consequently, even greater than the given figure. Therefore, to attain high pressure, any further closing of the dies involves deformation of the edges of the "lens" formed in each one of the dies. Consequently, with the pressure in excess of 100 kilobars it is to be expected that in most cases the dies would be destructed. It is only in a small number of cases that residual strengthening of the dies is accomplished, and the dies remain fit for further service.

In order to provide for a greater strength of the dies there has been proposed a "massive support" method. The method resides in creation of dies wherein the area of the working surface, which is directly acted upon by the high pressure, is approximately one tenth of the area of the bearing surface of the dies to which the effort of the press is applied. In this case the height of the die is made sufficiently great. This geometry has been chosen to ensure that the critical stress produced in the body of the dies should not reach the side and bearing surfaces of these dies. In this way the dies may be saved from destruction. However, this "massive support" method does not solve the problem of reducing the value of elastic deformation and preventing residual deformation of the working surface of the dies on account of the action of the high pressure, since the stress within the body of the dies is not distributed uniformly. On account of this non-uniform distribution of the internal stress, the dies are subjected to relatively great elastic and residual deformation along the longitudinal axis of symmetry thereof, this non-uniformity increasing, as the difference between the areas of the bearing and working surfaces increases.

Therefore, in both abovedescribed structures of an apparatus for producing high pressure, different normal stresses act at the opposite faces of each die, the normal stress at the working surface being substantially greater than the normal stress at the bearing surfaces of the respective faces of the dies, to which the die closing effort is applied.

When high pressure P is produced in the test sample and in the solid medium surrounding this test sample, the working surface of the die is acted upon by this pressure P, and there is produced in the body of the die normal stress of a relatively great value $\sigma_1 = -P$, directed toward the bearing surface of the die. This stress is substantially greater than normal stress $\sigma_2$ produced at the bearing surface of the die under the action of the associated press, $\sigma_2 = -F$. Therefore, with pressure P being very great (P >> F), resultant normal stress $\sigma$ equals $\sigma_1 - \sigma_2 = P_1(-F) = -P + F$ and is considerably in excess of the ultimate normal stress of the material of the die, this resultant stress acting in the direction from the working surface of the die toward the bearing surface thereof. Consequently, the die is subjected to considerable elastic and residual deformation along the axis of symmetry thereof and more often than not becomes destructed. It should be noted that deformation of the die is somewhat "one-sided," i.e. it displays itself in sagging or caving-in of the working face of the die; the bearing face of the die, which is acted upon by the die closing means, being subjected to practically no deformation whatever. Even when the die displays no residual deformation at certain values of P, it is subjected to relatively great elastic deformation just the same, which greatly complicates the task of setting pressures in excess of 150 kilobars.

The authors of the present invention have already disclosed earlier a high pressure producing apparatus comprising a pair of similar dies arranged coaxially in opposition to each other, the surfaces of these dies, facing each other, having cut therein annular grooves concentric with the central portions of these dies. A test sample is placed to contact these central portions and is surrounded by a soild medium capable of transmitting to this sample the pressure produced as the dies are being driven toward each other, the grooves being intended to be filled with the solid medium and to form a single space, as the dies are gradually closed one upon the other.

In the dies of the last-described apparatus there appear both tangential and normal stresses both within the central portion and in the area of the annular grooves. The distribution of these stresses is such that they enable to reduce shear stress both internally and externally of the grooves. Furthermore, the central portion of each die, which is subjected to maximal normal and tangential stress, is in some sence as if "supported" by the portion of the die where the grooves are positioned and where the stress is of a lower magnitude.

However, the great normal stress in the central portion of each die is not compensated for, which leads to axial deformation of this central portion.

It is an object of the present invention to reduce deformation of the dies, brought about by production of a high pressure.

It is another object of the present invention to create an apparatus capable of producing high pressure, as high as 150 kilobars and higher.

It is still another object of the present invention to prolong the operational life of the dies.

These and other objects are attained in an apparatus for producing high pressure, comprising two similar dies arranged coaxially in opposition to each other, a test sample placed intermediate of the central portions of the faces of these dies, facing each other, said test sample being surrounded by a solid medium that is plastic under pressure, this medium being capable of transmitting to said test sample the pressure created within said medium upon said dies being driven toward each other under the action of means for driving said dies, in which apparatus, in accordance with the present invention, each said die has in the face thereof, facing said die driving means, an annular groove having its internal and external edges, relative to the centre of said respective face, extending along two concentric imaginary circles of which the centre is said centre of said face, a solid medium which is plastic under pressure being placed intermediate of said die driving means and said respective faces of said dies, said last-mentioned medium adjoining the respective surfaces of said faces over the central portions of said faces, defined by said respective grooves, said last-mentioned medium overlying each said groove along the entire length thereof and at least partly in cross-section.

With the dies being of the above structure, the pressures created at the opposite faces of each die are of substantially similar values and are directed in opposition to each other, which leads to either complete elimination or else to substantial reduction of the stress gradient along the longitudinal axis of each die, thus providing for uniform distribution of the stress in the body of each die, along the axis of symmetry thereof.

It is advisable that the area of the central portion of each die, defined by the respective groove, should be either equal to or slightly greater than the area over which there is placed said pressure-transmitting medium.

According to one embodiment of the present invention, the material of said medium adjoining said face features the factors of compressibility and internal friction that are substantially equal to the respective characteristics of the medium transmitting pressure to said sample.

According to another embodiment of the present invention the material of said medium adjoining said face has the factor of compressibility that is smaller than and the factor of internal friction that is greater than the respective characteristics of the medium transmitting pressure to said sample.

It is advisable that a gasket should be interposed intermediate of said die driving means and said solid medium, the surface of said gasket, facing said die, having a shape that is similar to the shape of the surface of said face of said die.

The present invention will be further described by description of embodiments thereof, with reference being had to the accompanying drawings, wherein.

Figure 1:
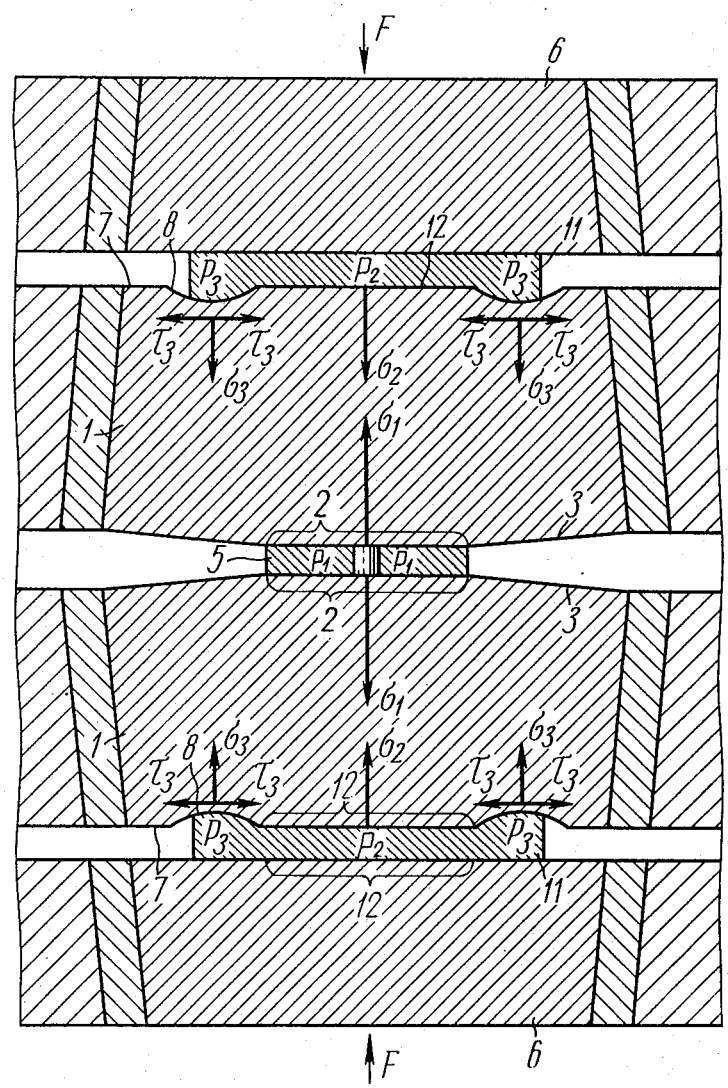
FIG. 1 illustrates a high pressure producing apparatus in accordance with the present invention.

Referring now in particular to the appended drawings, the herein disclosed apparatus comprises two identical coaxially arranged dies 1, the central portions 2 of the faces 3 of these dies, facing each other, having placed therebetween a test sample 4 surrounded by a solid medium 5 that is plastic under pressure and is capable of transmitting to this sample 4 the pressure produced as said dies are closed upon each other, i.e. are driven toward each other. For the sake of brevity, the faces 2 of the dies, facing each other, will be hereinafter referred to as the working surfaces or faces.

The dies are driven together by the respective plungers 6 of an associated press (not shown), acting as the die driving means.

Figure 2:
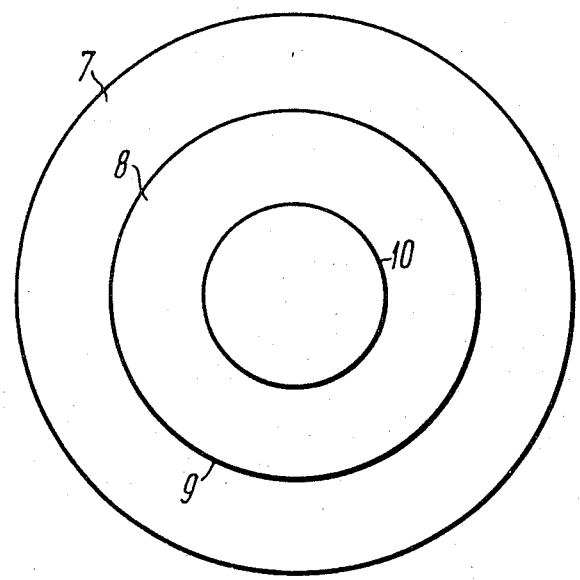
FIG. 2 shows the die of the apparatus, as viewed from the side at which the effort is applied thereto by the die driving means.
Figure 3:
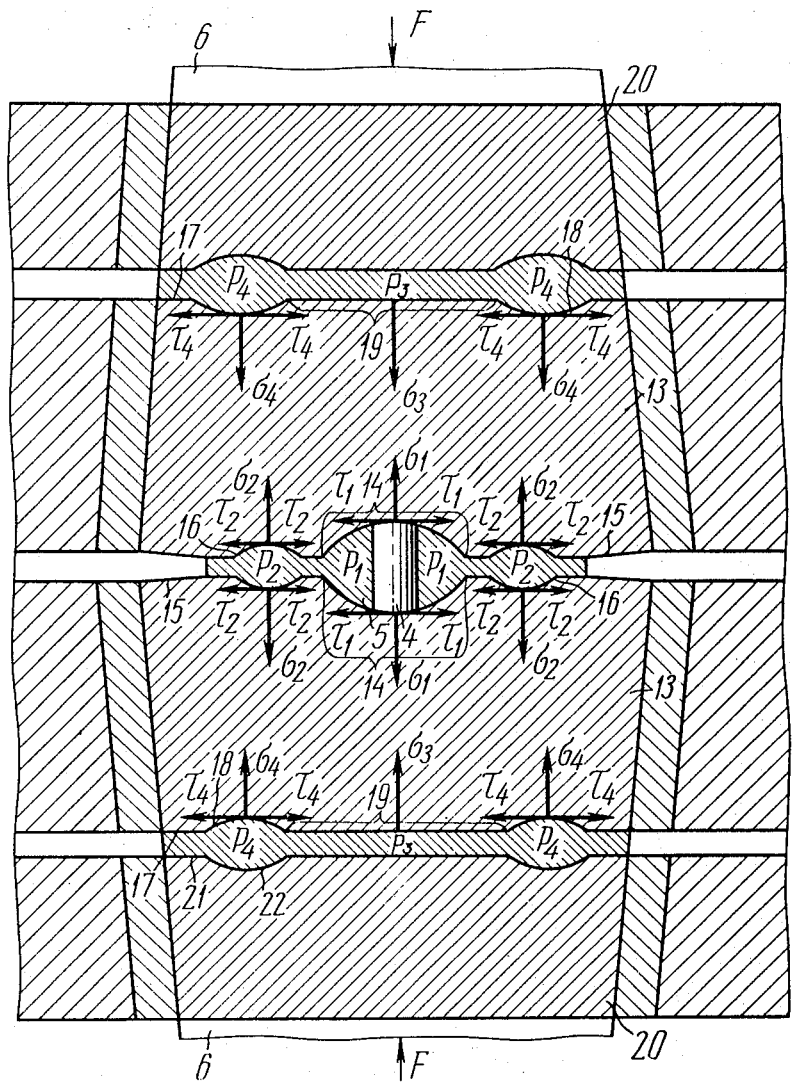
FIG. 3 is an alternative embodiment of the high pressure producing apparatus in accordance with the invention.

The faces 7 of the dies 1, facing the respective plungers 6, have in each of them an annular groove 8 (see also FIG. 2). The external and internal edges 9 and 10, respectively, of this groove 8, in respect of the centre of the face of the die 1, extend along corresponding imaginary concentric circles having their centre at the centre of the respective face 7.

Placed intermediate of the faces 7 (FIG. 1) and the respective plungers 6 is a solid medium 11 which is plastic under pressure, e.g. the same medium that is used for transmitting pressure to the sample 4, for instance, of lithographic stone. This medium 11 closely adjoins the surface of the faces 7 over the respective central portions 12 thereof, defined by the grooves 8, and partly fills these grooves along their entire lengths or circumferences. It is advisable that the area of the central portion 12 of the face 7, encircled by the groove 8, should be equal to or slightly greater than the area 2 of the central portion 2 of the working surface 3.

For better comprehension of the essence of the present invention, considered below is the operation of the abovedisclosed apparatus.

At the dies are driven together under the effort ( F ) of the plungers 6, the solid medium 11 is compressed, and there are produced thereinside areas subjected to different pressure values $P_2$ and $P_3$. The pressure value $P_2$ is produced in that part of the medium which directly adjoins the central portion 12 of the face 7. The pressure value $P_3$ is produced within the solid medium filling the annular groove 8. The creation of the pressure values $P_2$ and $P_3$ is due to the main principle of production of pressure within a solid medium, based on a combination of compression and flow of this solid medium.

The value of pressure $P_2$ is considerably greater than that of pressure $P_3$. Firstly, the thickness of the solid medium wherein the pressure value $P_2$ is generated is smaller than the thickness of the solid medium adjoining the surface of the annular groove 8 by the depth of this groove 8. Secondly, pressure $P_3$ opposes the flow of the solid medium which is under pressure $P_2$ and thus actively promotes rapid build-up of pressure $P_2$.

Therefore, the solid medium which is under active action of pressure $P_2$ is as if enclosed within a limited volume, whereby when this part of the solid medium is compressed, pressure $P_2$ is rapidly built up therein. The value of pressure $P_2$ in the course of a testing operation may be either equal to or greater than or else of the same magnitude with the value of pressure $P_1$ which is generated within the sample 4 and within the solid medium 5 enclosing this sample. A desired ratio $P_1 : P_2$ may thus be selected to correspond to the actual task of a test.

It can be seen from the abovesaid that when the faces of the dies, adapted to be engaged by the die driving means, have each cut therein an annular groove with a solid medium interposed between the face and the die driving means, the overall distribution of the pressure values is considerably more complicated than in the case a flat face directly engaged by the plunger 6 of the press, when the effort is uniformly distributed over this flat face.

The action of pressures $P_2$ and $P_3$ produces inside the die normal stress values $\sigma_2 = -P_2$ and $\sigma_3 = -P_2$, as well as tangential stress $\tau_3$.

The value of normal stress $\sigma_2$ is about the same as that of normal stress $\sigma_1$ produced in the body of the die by the action of pressure $P_1$. Stress $\sigma_2$ acts in opposition to stress $\sigma_1$, whereby there is no great gradient of stress in the respective bodies of the dies along the axis of symmetry thereof. The dies are subjected to compression along this axis of symmetry from both faces under the action of the pressure values of similar magnitude.

Consequently, the working surface of the die is subjected to considerably smaller deformation. As the value of the deformation of the working surface of the die is reduced, the greater part of the variation of the volume, as the dies are being closed, is spent on the compression of the test sample and of the solid medium surrounding the latter. Therefore, considerably greater pressure values are attained, with the dies operating under elastic deformation conditions.

It is advisable that the solid medium 11 should be of a material which is of known record in the art of operating with great pressure values. Among such materials are catlinite, pyrophilite and other similar stone-like materials.

Actual selection of the material of the solid medium 11 is defined by the desirability of creation of a specified distribution of stress within the bodies of the dies 1 along the axes of symmetry thereof.

The solid media 5 and 11 may have substantially similar factors of compressibility and internal friction. Then, with the dimensions of the solid media 5 and 11 over the central portions 2 and 12, respectively, being equal to each other, there are produced in the body of each die equal stress values along the axis of symmetry. However, in order to reduce the deformation of the central portion 2 of the working surface 3 of the die 1 during a test to a maximal degree, the stress value produced at the central portion 12 of the face 7 should be greater than the value of stress produced at the central portion 2 of the working surface 3 of each die.

This latter can be attained by the build-up of pressure P being more rapid than that of pressure $P_1$. In this case the compressibility of the medium 11 should be smaller than that of the solid medium 5. To attain this, the material of the solid medium 11 adjoining the central portion 12 of the bearing faces 7 may be copper or soft steel.

Figure 4:
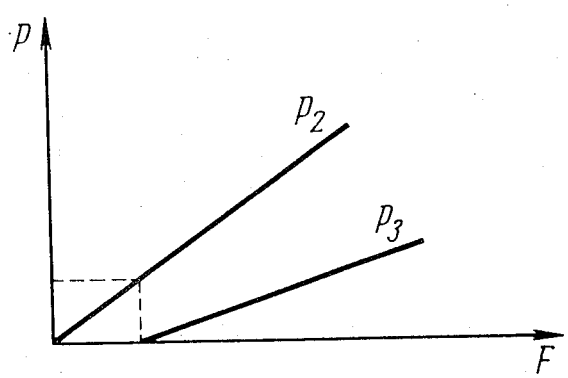
FIG. 4 is a diagram illustrating the dependence of the pressure produced on the effort of the press, with the groove being filled but partly.

In the abovedisclosed embodiment the solid medium 11 overlies the groove 8 but partly. In this case, as the dies are being driven together, the pressure values $P_2$ and $P_3$ are not built up simultaneously (FIG. 4) which might be quite desirable, when operating with dies of a relatively great size.

In some cases, however, e.g. when operating with relatively small dies it is desirable that the pressure value $P_3$ should be built up simultaneously with the pressure value $P_2$. In such cases the solid medium 11 should completely overlie the groove 8 prior to commencing of the driving action of the press.

The herein disclosed apparatus, embodying the present invention, displays utmost effectiveness when the working surfaces of the dies are likewise provided with annular grooves.

Then the apparatus for producing high pressure in accordance with the invention includes a pair of similar coaxially arranged opposing dies 13 having respective central portions 14 receiving therebetween a test sample 4 surrounded by a solid medium 5 capable of transmitting to this test sample 4 the pressure produced within this medium 5, as the dies 13 are driven toward each other. The dies 13 have cut in the surfaces 15 thereof, facing each other, annular grooves 16, one per each die, the grooves 16 being concentric with the central portions 14 and encircling the latter, the solid medium 5 being enclosed between these central portions 14 and filling the grooves 16. As the dies 13 are driven together, the grooves 16 define therebetween a space filled with the solid medium 5.

Each die 13 further has in the face 17 thereof, facing the respective plunger 6, an annular groove 18. The external and internal edges of the groove 18, relative to the centre of the respective face, extend along corresponding imaginary concentric circles of which the centre is the centre of the face 17. The diameter of the central portion 19 encircled by the internal edge of the groove 18 is preferably not smaller than the internal diameter of the groove 16 out in the working surface of each die 13. A solid medium 11 adjoins the surface of the face 17 over the entire area thereof, this medium displaying the same characteristics, as in the previously described embodiment.

Figure 5:
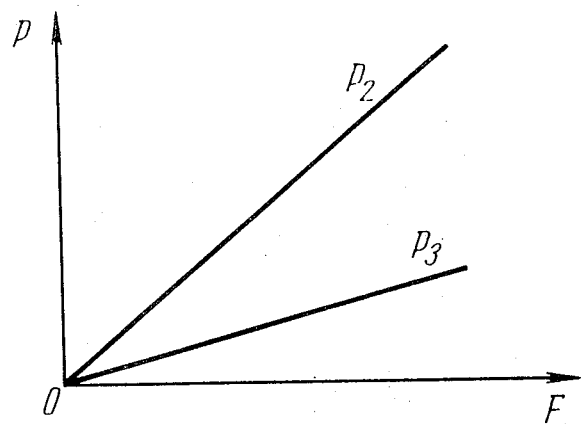
FIG. 5 is another diagram illustrating the dependence of the pressure produced on the effort of the press, with the groove having been pre-filled completely.

There is interposed between the respective plunger 6 of the associated press and the solid medium 11 a massive gasket 20, e.g. of tungsten carbide or of hardened steel. The face 21 of this gasket 20, facing the respective die 13, may be either flat or have a shape similar to the shape of the face 17 of the die, i.e. it may have therein a groove 22, as is shown in FIG. 5.

As the dies are being driven together, there are produced therein pressure values $P_1$ and $P_2$ which, in their turn, produce in the bodies of the dies normal stress values $\sigma_1 = -P_1$ and $\sigma_2 = -P_2$ directed toward the supporting surfaces A of the dies 13.

In the presently described embodiment, as the effort F of the press is built up, this effort is transmitted to the solid medium 11, and there is produced in this medium a pressure value $P_3$ active within the solid medium adjoining the central portions of the respective faces. There is further produced within the solid medium enclosed within the space defined by the annular grooves 18 and 22 a pressure value $P_4$ which is smaller than $P_3$. Consequently, there are produced in the bodies of the dies normal stresses $\sigma_3 = -P_3$ and $\sigma_4 = -P_4$ and tangential stress $\tau_4$. These normal stresses $\sigma_3$ and $\sigma_4$ are directed in opposition to the normal stresses $\sigma_1$ and $\sigma_2$ and counterbalance them. As a result, the dies are subjected to multi-sided compression under great pressure, which yields a sharp increase of the strength characteristics of the material of the dies, as well as absence of a stress gradient directed parallel to the vertical axis of symmetry of the dies.

Employment of the present invention enables to prolong the operational life of a high pressure chamber and to expand the range of attainable pressure values.

What we claim is:

1. An apparatus for producing high pressure, comprising a pair of similar coaxially arranged opposing dies, a test sample received intermediate the central portions of the respective faces of said dies, facing each other, said test sample being surrounded by a medium that is plastic under pressure and capable of transmitting to said test sample the pressure produced as said dies are being driven toward each other under the action of an external effort, each said die having in the face thereof, adapted to be acted upon by said external effort, an annular groove of which the external and internal edges relative to the centre of said face extend along respective concentric imaginary circles of which the centre is said centre of said face; means driving said dies together by exerting thereupon said external effort; a solid medium placed intermediate of said driving means and said face of each said die, facing said means, said last-mentioned medium being solid and plastic under pressure and adjoining said respective faces at the central portion thereof defined by said groove, said medium overlying said groove along the entire length thereof and at least partly in cross-section.

2. An apparatus as claimed in claim 1, wherein the areas of the central portions defined by the respective grooves in the faces of said dies, facing each other, and in the faces thereof facing said die driving means are substantially equal.

3. An apparatus as claimed in claim 1, wherein the material of said solid medium, adjoining said face features the factors of compressibility and of internal friction substantially equal to the factors of compressibility and of internal friction, respectively, featured by said medium transmitting pressure to said test sample.

4. An apparatus as claimed in claim 1, wherein the material of said solid medium adjoining said face features the factor of compressibility that is lower than and the factor of internal friction that are greater than the respective parameters of said solid medium transmitting pressure to said test sample.

5. An apparatus as claimed in claim 1, wherein a gasket is interposed between said die driving means and said solid medium adjoining said face, the surface of said gasket, facing said die, having a shape similar to that of said face of said die.

* * * * *